United States Patent
Agarwal et al.

(10) Patent No.: US 9,495,083 B2
(45) Date of Patent: Nov. 15, 2016

(54) SYMBOLIC REFERENTIAL THIRD-PARTY NOTIFICATION

(71) Applicant: International Business Machines Corporation, Armonk, NY (US)

(72) Inventors: Piyush K. Agarwal, Billerica, MA (US); James J. Antill, Dublin (IE); Vincent P. Burckhardt, Meath (IE); Bernadette A. Carter, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 370 days.

(21) Appl. No.: 14/279,897

(22) Filed: May 16, 2014

(65) Prior Publication Data

US 2015/0334072 A1 Nov. 19, 2015

(51) Int. Cl.
*G06F 3/0484* (2013.01)
*H04L 12/58* (2006.01)
*G06F 17/30* (2006.01)
*H04L 29/08* (2006.01)

(52) U.S. Cl.
CPC ............ *G06F 3/0484* (2013.01); *G06F 17/30* (2013.01); *G06F 17/30867* (2013.01); *H04L 51/24* (2013.01); *H04L 51/32* (2013.01); *H04L 67/26* (2013.01)

(58) Field of Classification Search
CPC .................................................... G06F 3/0484
USPC ........................................................ 715/753
See application file for complete search history.

(56) References Cited

U.S. PATENT DOCUMENTS 6,665,658 B1 * 12/2003 DaCosta .......... G06F 17/30864
7,565,630 B1 * 7/2009 Kamvar .......... G06F 17/30867
9,015,162 B2 * 4/2015 Chi .................... G06Q 50/01 707/713
9,036,083 B1 * 5/2015 Zhu .................... H04N 5/445 348/465
9,299,081 B2 * 3/2016 Dror .................. G06Q 30/02
2004/0205645 A1 * 10/2004 Hoffman ........... G06F 17/243 715/255
2007/0214097 A1 * 9/2007 Parsons ........... G06F 17/30864 706/12

(Continued)

OTHER PUBLICATIONS

Axel Bruns, et al., New Methodologies for Researching News Discussion on Twitter, The Future of Journalism 2011, Sep. 8, 2011, pp. 1-13, Cardiff University, Cardiff, UK, Published online at: http://eprints.qut.edu.au/46330/.

(Continued)

*Primary Examiner* — Reza Nabi
(74) *Attorney, Agent, or Firm* — Lee, Law, PLLC; Christopher B. Lee

(57) ABSTRACT

User input including a social network notification symbol followed by a social network tag is detected in association with a social network user interface. The social network tag includes a text keyword that identifies a social network topic within the social network. A subset of social network users within the social network that follow the social network topic identified by the text keyword of the social network tag is determined. A referential third-party social network user notification subset within the social network is defined as the determined subset of social network users within the social network that follow the social network topic. A referential third-party social network notification is published to the defined referential third-party social network user notification subset within the social network. The referential third-party social network notification includes the detected user input that includes the social network notification symbol followed by the social network tag.

13 Claims, 5 Drawing Sheets

(56) References Cited

U.S. PATENT DOCUMENTS

| | | | | |
|---|---|---|---|---|
| 2009/0228357 | A1* | 9/2009 | Turakhia | G06F 17/30867 705/14.53 |
| 2011/0307780 | A1* | 12/2011 | Harris | G06F 9/4446 715/708 |
| 2012/0130918 | A1* | 5/2012 | Gordon | G06Q 50/01 705/347 |
| 2012/0158693 | A1* | 6/2012 | Papadimitriou | G06F 17/30864 707/708 |
| 2012/0166457 | A1* | 6/2012 | Ross | G06F 17/30616 707/755 |
| 2012/0246578 | A1* | 9/2012 | Baldwin | G06Q 50/01 715/753 |
| 2013/0304904 | A1* | 11/2013 | Mouline | H04L 43/045 709/224 |
| 2014/0214831 | A1* | 7/2014 | Chi | G06Q 50/01 707/737 |
| 2014/0228010 | A1* | 8/2014 | Barbulescu | H04W 4/06 455/414.4 |
| 2015/0032504 | A1* | 1/2015 | Elango | G06Q 30/0201 705/7.29 |
| 2015/0111190 | A1* | 4/2015 | Vittorio | G06F 17/30867 434/319 |
| 2015/0199772 | A1* | 7/2015 | Sherman | G06Q 30/0643 705/319 |
| 2016/0048274 | A1* | 2/2016 | Rosenberg | G06F 3/0482 715/753 |
| 2016/0078458 | A1* | 3/2016 | Gold | G06Q 30/0203 705/7.32 |
| 2016/0132904 | A1* | 5/2016 | Mondal | G06Q 50/01 705/7.29 |
| 2016/0154570 | A1* | 6/2016 | Rosenberg | E21B 47/122 715/753 |
| 2016/0170594 | A1* | 6/2016 | Rosenberg | G06F 3/0484 715/753 |
| 2016/0170616 | A1* | 6/2016 | Rosenberg | G06F 3/04842 715/753 |

OTHER PUBLICATIONS

Author Unknown, Using a Jive Community, JiveSoftware.com help article, Printed from website on May 13, 2014, pp. 1-59, JiveSoftware.com, Published online at: http://docs.jivesoftware.com/jive_sbs/5.0/topic/com.jivesoftware.help.sbs.online_5.0/pdf/UsingaJiveCommunity.pdf.

Ben Parr, Breaking: Facebook Introduces @Mentions in Status Updates, Webpage/site, Sep. 10, 2009, pp. 1-27, Mashable.com, Published online at: http://mashable.com/2009/09/10/facebook-mentions/.

Author Unknown, What are @replies and mentions?, Twitter.com help article, Printed from website on May 13, 2014, pp. 1-2, Twitter, Inc., Published online at: http://support.twitter.com/articles/14023-what-are-replies-and-mentions#.

IBM, List of IBM Patents or Patent Applications Treated as Related, Applicant Appendix, Jun. 11, 2015, pp. 1-2, the contents of which are incorporated herein by reference in their entirety.

* cited by examiner

SYMBOLIC REFERENTIAL THIRD-PARTY NOTIFICATION

BACKGROUND

The present invention relates to social network notifications. More particularly, the present invention relates to symbolic referential third-party notification.

Social networks allow users to communicate with one another in an online web-based environment. Social network groups may be formed from social network contacts. Social network users within a social network group may post messages, photographs, and other information that may be viewed by other social network contacts within the social network group.

BRIEF SUMMARY

A method includes detecting, by a processor in association with a social network user interface, user input comprising a social network notification symbol followed by a social network tag, where the social network tag comprises a text keyword that identifies a social network topic within the social network; determining a subset of social network users within the social network that follow the social network topic identified by the text keyword of the social network tag; defining a referential third-party social network user notification subset within the social network as the determined subset of social network users within the social network that follow the social network topic; and publishing, to the defined referential third-party social network user notification subset within the social network, a referential third-party social network notification comprising the detected user input that comprises the social network notification symbol followed by the social network tag.

A system includes an input device and a processor programmed to: detect, via the user input device in association with a social network user interface, user input comprising a social network notification symbol followed by a social network tag, where the social network tag comprises a text keyword that identifies a social network topic within the social network; determine a subset of social network users within the social network that follow the social network topic identified by the text keyword of the social network tag; define a referential third-party social network user notification subset within the social network as the determined subset of social network users within the social network that follow the social network topic; and publish, to the defined referential third-party social network user notification subset within the social network, a referential third-party social network notification comprising the detected user input that comprises the social network notification symbol followed by the social network tag.

A computer program product includes a computer readable storage medium having computer readable program code embodied therewith, where the computer readable program code when executed on a computer causes the computer to: detect, in association with a social network user interface, user input comprising a social network notification symbol followed by a social network tag, where the social network tag comprises a text keyword that identifies a social network topic within the social network; determine a subset of social network users within the social network that follow the social network topic identified by the text keyword of the social network tag; define a referential third-party social network user notification subset within the social network as the determined subset of social network users within the social network that follow the social network topic; and publish, to the defined referential third-party social network user notification subset within the social network, a referential third-party social network notification comprising the detected user input that comprises the social network notification symbol followed by the social network tag.

DETAILED DESCRIPTION

Figure 1:
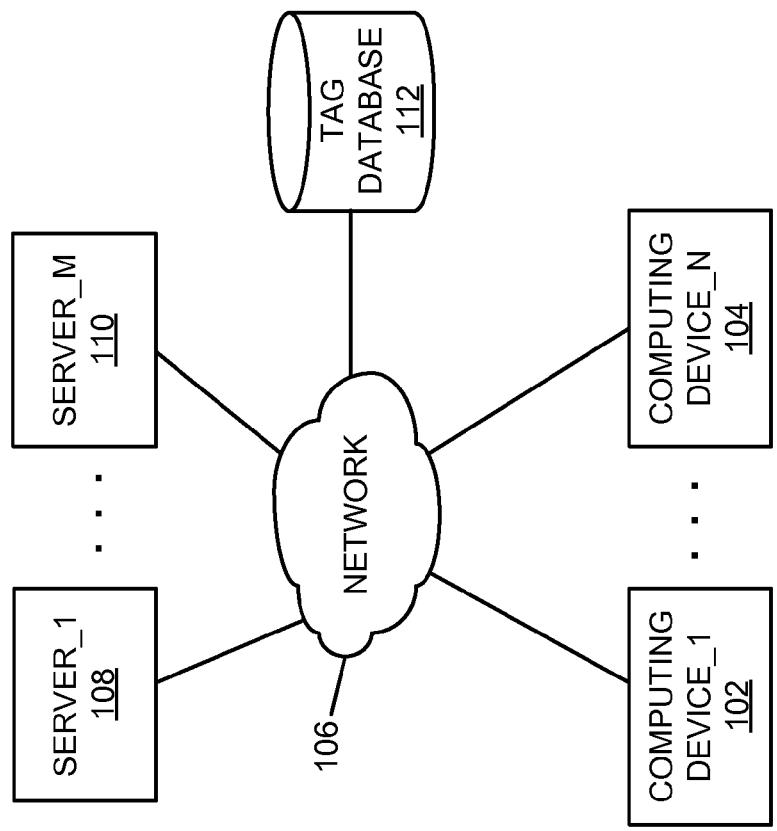
FIG. 1 is a block diagram of an example of an implementation of a system for symbolic referential third-party notification according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides symbolic referential third-party notification. The present technology provides referential redirection of symbolic notifications. The notifications as entered by a user specify one or more social network tags to be used to redirect the notifications themselves to third-party social network tag followers and tagged entities (e.g., users, organizations, etc.). Users of the present technology may enter a designated social network notification symbol followed by a social network tag that includes a text keyword. Based upon detection of the user input, a subset of social network users within the social network that follow a social network topic that is identified by the text keyword of the social network tag is determined. A referential third-party social network user notification subset is defined within the social network as the subset of social network users that follow the social network topic and/or that are tagged with the respective tag(s). The notification is published to the defined referential third-party social network user notification subset within the social network.

As such, the symbolic referential third-party notification utilizes recognized symbols and topic identifiers/keywords within the user input to identify a targeted third-party subset of social network users that are referentially associated with the topic identifiers (by following or being tagged with the tags within the social network). A notification is redirected to the targeted subset of social network users that are referentially identified by their associations with the respective tags. The notification is sent to the respective social network users in the defined referential third-party social network user notification subset.

It should be noted that the subset of social network users is also notified of the reason for being notified by the direct inclusion within the notification itself of the tag or tags that they follow or were tagged with within the social network. Accordingly, both the notification itself and the logic by which the notification is delivered are provided to the respective subset of social network users. Further, within the present description, the term to "mention" or to "notify" a social network user means to directly send a public notification to the targeted respective social network users, such as on the users' social network message board.

As described in more detail below, a social network user may additionally enter a question or statement in association with the referential third-party notifications to elicit information, help, and/or feedback from the referenced third-party group of social network users. As such, user communication with other social network users with similar interests may be improved using the present technology.

For purposes of the examples that follow, social network notification symbols are represented using @mention notation (e.g., "@" followed by additional text). However, it is understood that any form of social network notification symbol may be utilized in association with the present technology. For example, alternative social network notification symbols may include a double at symbol (e.g., "@@"), a plus symbol (e.g., "+"), a double plus symbol (e.g., "++"), or any other form of social network notification symbol appropriate for a given implementation.

Additionally, the examples that follow utilize tags that are formed using a social network tag identification symbol followed by a keyword of a topic within a social network. Users may post information within a social network using tags, or may tag other social network users with tags, meaning that the other social network users are "tagged" within the social network. A social network user that is tagged is thereby associated with the topic identified by the text keyword of the tag within the social network.

For example, a network tag identification symbol, such as a pound symbol (e.g., "#"), may be followed by a keyword of a topic to formulate what may be referred to as a "hashtag." However, it is understood that any form of social network tag identification symbol may be utilized in association with the present technology to formulate a tag for use in association with the present technology. For example, alternative social network tag identification symbols from which tags may be formulated may include a double pound symbol (e.g., "##"), a caret symbol (e.g., "^"), a double caret symbol (e.g., "^^"), or any other form of social network tag identification symbol appropriate for a given implementation. In any implementation, use of a social network tag identification symbol in conjunction with a topic keyword forms a "tag" for purposes of the present description.

Further, the examples that follow represent sequences of social network notification symbols and tags as concatenated sequences for ease of description purposes. However, it is additionally understood that one or more spaces or other characters, such as underscores (e.g., "_") or dashes (e.g., "-"), may be utilized to form combinations of social network notification symbols and tags, again as appropriate for a given implementation.

Continuing with the description of the present technology, user input for symbolic referential third-party notification may include a social network notification symbol followed by multiple tags (e.g., "@#keyword1&#keyword2" or "@#keyword1#keyword2"). As can be seen from these examples, the multiple tags may be separated by logical operators (e.g., "&"). Where no logical operator separates the multiple tags, an "and" operation may be performed by default.

Where multiple tags are detected in association with a social network notification symbol, combining and/or filtering of a social network follower and tagged entity may be performed. Processing of a combined tag results in a combined and/or filtered referential third-party social network user notification subset.

The referential third-party social network notification may then be sent to the combined and/or filtered subsets of the respective social network tag followers and/or to social network entities that are tagged by each of the particular combinations of tags. As such, the present technology further facilitates construction of enhanced social network notification sub-groups that are defined using established ad-hoc social network groups, but that do not otherwise exist within the social network. These enhanced social network notification sub-groups may further be reused.

Additionally, it should be noted that the ad-hoc social network notification sub-groups and the enhanced (combined/filtered) social network notification sub-group remain relevant within the social network as user interests change based upon the social network user's follow interests and entity tags. As user interests change over time, the notifications to the ad-hoc social network notification sub-groups and the enhanced social network notification sub-groups may remain available for interested users based upon follow interests and tagging within the social network.

The present technology may perform additional processing in response to receipt of user input that combines one or more social network notification symbols with social network tags. This processing may allow users to engage with followers of a specific "tag"/topic without having to become part of a particular social network group. Further, users may engage with entities that are tagged with specific social network tags without the need to create a formal social connection (e.g., "friend" connection) within the social network, and the processing may provide a way to generate a third-party redirected notification to other users that have been tagged with specific keywords in a particular post or status update.

Regarding detection of and specification of tags for third-party referential notification redirection, a user may be provided with an ability to generate the notification to the referential subset of social network users as the user is entering the input (e.g., in real time). For example, if a user enters a status update post and denotes a social network notification symbol (e.g., "@" construct) followed by a tag-related identification symbol (e.g., "#"), a type-ahead or pop-up listing of available tags that are already being followed and that are available in the social network may be provided to the user for selection. The user may select one or more of the available listed and followed tags and the selected tag(s) may be appended to the social network notification symbol and the tag symbol (e.g., "@#keyword") to initiate a symbolic referential third-party notification to followers of the tag and/or to entities tagged with the respective tag(s). The user may alternatively manually type the full tag names, as appropriate for a given implementation.

Further regarding social network follower and entity tagging, if the user enters another tag symbol (e.g., again "#" for purposes of example), an option may be provided to the user to combine the tags for the third-party referential notification redirection. For example, as described above, a constructed third-party referential notification redirection, such as "@#keyword1&#keyword2," may be specified. In the case of a logical "and" operation (e.g., "&") of the respective tags, a combined referential third-party social network user notification subset may be defined as the set of all social network users that follow or are tagged by both tags (e.g., each of "keyword1" and "keyword2"). For purposes of the present description, a logical "and" operator, such as "&" or "and," may be considered a logical union operator.

Regarding additional social network follower and entity combination and filtering options, users may be provided with options to notify people that follow one tag and that specifically do not follow another tag (e.g., "@#keyword1&!#keyword2"). Within this example, the use of the combination of the "and" symbol followed by the exclamation point symbol ("&!") between the "keyword1" and the "keyword2" denotes inclusion of the followers of "keyword1," but not the followers of "keyword2." As such, the exclamation point represents follower groups/tags that are to be excluded by filtering. For purposes of the present description, a logical exclusion operator, such as "&!" or "and not," that specifies exclusion of followers of one or more additional social network tag may be considered a logical exclusion operator.

Other possible logical combinations of tags are possible. For example, a parallel mathematical symbol (e.g., "∥") may represent a logical "or" of the designated tags. In such a logical combination, a third-party referential @mention redirection such as "@keyword1 ∥ keyword2" may generate notifications to social network users or entities that follow or that are tagged with either "keyword1" or "keyword2."

Additionally, the present technology provides for notifications to be generated for new tags to specify new (nonexistent) ad-hoc social network groups. For example, a user may create the third-party referential notification redirection prior to any other followers of the specified tag(s) or any tagging of other social network users with the tag. When any social network user begins following the tag or group of tags, or when an entity is tagged with the tag specified within the symbolic referential third-party notification, the followers or tagged entity may be provided with an option to receive historical notifications. Where the social network user/entity elects to receive the historical notifications, the notification requested by the user that created the third-party referential notification redirection may be provided to the social network users or entities. As such, improved communication opportunities with ad-hoc social network groups may endure to allow users to seek other users with whom to communicate on topics of interest even prior to any other social network users being interested in the respective topics.

As an example use case of the present technology, it is presumed that a user desires to ask a question of persons that have knowledge about a particular topic, such as analytics sessions for a particular product named "productName." The user may generate a third-party referential notification redirection, such as:

"@#productName&#analytics What are the best productName analytics sessions to attend?"

Within this example, and regarding the scenario of social network followers, a notification may be provided, based upon this third-party referential notification redirection, to all social network users that follow the tags "productName" and "analytics" within the social network. The generated notification may result in analytics experts that are familiar with the product referenced by "productName" providing the user with suggestions/help with respect to preferred local or online analytics sessions related to the identified product. Further, the present technology may be configured to prioritize symbolic referential third-party notifications ahead of general postings to a follower's message board.

As such, a tag follower with knowledge of both combined topics may see the notification/request prioritized in their notifications ahead of other related posts to the respective topics in their stream of postings, and may further recognize the request as more important than general postings or may recognize that the user is requesting feedback/help on the topic(s) rather than just generating an informational posting. The tag follower may know immediately from the notification itself both the text updated to user's notifications and the specific reason/logic with respect to why the notification was surfaced/prioritized (e.g., because the user is following both of the two tags). The tag follower then may quickly offer assistance to the requesting user based upon the prioritized notification provided by the third-party referential notification redirection, and may read and other informational posting of only "#keywords" when the tag follower has more available reading time. Again, as described above, no formal social network connection has to be formed between the two users because the symbolic referential third-party notification reuses existing ad-hoc follower groups and generates targeted notifications to these followers (and to tagged social network users).

Continuing with the current example, and regarding the scenario of entities that have been tagged, a notification may be provided based upon this third-party referential notification redirection to all entities and/or social network users that have been tagged with "productName," such as "presenters" of analytics sessions. As such, the present technology utilizes tagged individuals and entities to identify persons that may be able to answer to the user's question.

The notifications described herein may also be displayed to contacts of the social network follower contacts. Again continuing with the current example, where a respective social network tag follower agrees to have notifications that are generated using the third-party referential notification redirection displayed on the follower's profile page or message board so that contacts of the follower may see the notifications, the post may be augmented with the follower's social network identifier (e.g., Person A) and may be displayed to the follower's social network contacts as:

"@PersonA (#productName&#analytics) What are the best productName analytics sessions to attend?"

Within this context, the specific tag(s) and the actual question are posted to the follower's message board, so that the follower's contacts see the notification and the logic by which the follower received the notification. This provides a clear indication of who received the third-party referential notification redirection and why that social network user/entity received the third-party referential notification redirection. As such, and as introduced above, the third-party referential notification redirection exposes the logic by which the particular user/entity was notified because the reasoning behind the notification is posted with the notification itself to the message board.

Further, a different/unique font and/or style may be applied to third-party referential notification redirection based upon the following versus entity-tagged scenarios to further distinguish how the respective notifications reached the respective users/entities. As such, other social network users may learn how particular social network users/entities are sought after for expertise in particular areas of interest to the respective social network users/entities. This may further help to bring the respective social network users/entities to the forefront of recognition in their particular fields of study or profession by other social network users as reflected in their particular areas of interest.

As such, the present technology allows an author of content posted to a social network to notify both all social network users that follow one or more tags (all followers may be notified) and further allows all social network users/entities that are tagged within content references to be notified. Users may select inputs, tags and rules (e.g., logical combinations of tags) in combination to control notifications to followers and tagged users. Many possible implementations of third-party referential notification redirection are possible, and all such possibilities are considered within the scope of the present subject matter.

It should be noted that conception of the present subject matter resulted from recognition of certain limitations associated with social media notification mechanisms. For example, it was observed that "hashtags" are used by certain social networks to provide a semblance of organization/order for social network posts. It was also observed that hashtags may be used to search for or gain access to information within social networks, such as to search for content related to a topic or to enable users to "follow" topics or to post information to topics, and that hashtags may be used to "tag" individual users. Additionally, it was observed that followers of a hashtag may represent an ad-hoc group of users that may not otherwise be defined as a group within the social network. It was further observed that, while users may follow hashtags/topics within social networks, the increased amount of content that is being created within social networks often makes it prohibitive for every user that is following a given hashtag to read the entire thread of associated content. It was additionally observed that there is a difference between general postings and notifications. For example, it was observed that a conventional posting with a hashtag requires followers to actually find and read the posting. The present technology actually notifies third-party entities that have been tagged or third-party followers of a tag that a request to interact with tagged users or followers of the tag has been posted. Further, the present technology allows a user to request feedback/information from tagged users or followers of a tag, or to just generally notify or emphasize information to tagged users or to followers ("FYI") of the tag).

In view of these observations, it was determined that prior social network technologies do not enable generation of notifications to third-party users that have been tagged and do not enable generation of notifications to ad-hoc third-party groups that are defined within social networks using hashtags (e.g., followers of hashtags). It was further determined that technology that enables users to generate notifications within social networks to third-party users that have been tagged and to generate notifications to ad-hoc third-party groups that are defined within social networks using hashtags was desirable. It was further determined that a mechanism by which to @mention people with specific characteristics from a status update input area would also be desirable. It was additionally determined that it was desirable to provide scope filtering and flexibility by allowing an @mention to reference multiple hashtags so that people that "like"/follow multiple pages may be identified and notified (e.g., a subset potentially of followers of only a single hashtag).

The present subject matter improves social network notification technology by providing for symbolic referential third-party notification, as described above and in more detail below. The present technology further provides a mechanism to construct ad-hoc notification groups that remain relevant with respect to social network user interests based upon the social network user's follow interests and tagging. As such, improved social network notification may be obtained through use of the present technology.

The symbolic referential third-party notification described herein may be performed in real time to allow prompt social network notification to third-parties, such as followers of hashtags and tagged social network users. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for symbolic referential third-party notification. A computing device_1 102 through a computing device_N 104 communicate via a network 106 with several other devices. The other devices include a server_1 108 through a server_M 110 and a tag database 112. The tag database 112 may be implemented as one or more databases and may store tags that are defined within one or more social networks provided by the server_1 108 through the server_M 110.

As will be described in more detail below in association with FIG. 2 through FIG. 4B, the computing device_1 102 through the computing device_N 104 and/or the server_1 108 through the server_M 110 may each provide automated symbolic referential third-party notification. The automated symbolic referential third-party notification is based upon definition of referential third-party social network user notification subsets within the social network based upon one or more symbolic references to third-parties, such as tags that indirectly form ad-hoc groups of followers of topics within a social network. The present technology may be implemented at a user computing device or server device level. A variety of possibilities exist for implementation of the present subject matter, and all such possibilities are considered within the scope of the present subject matter.

It should be noted that any of the respective computing devices described in association with FIG. 1 may be portable computing devices, either by a user's ability to move the respective computing devices to different locations, or by the respective computing device's association with a portable platform, such as a plane, train, automobile, or other moving vehicle. It should also be noted that the respective computing devices may be any computing devices capable of processing information as described above and in more detail below. For example, the respective computing devices may include devices such as a personal computer (e.g., desktop, laptop, etc.) or a handheld device (e.g., cellular telephone, personal digital assistant (PDA), email device, music recording or playback device, tablet computing device, e-book reading device, etc.), a web server, an application server, or other data server device, or any other device capable of processing information as described above and in more detail below.

The network 106 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The tag database 112 may include a relational database, an object database, or any other storage type of device. As such, the tag database 112 may be implemented as appropriate for a given implementation.

Figure 2:
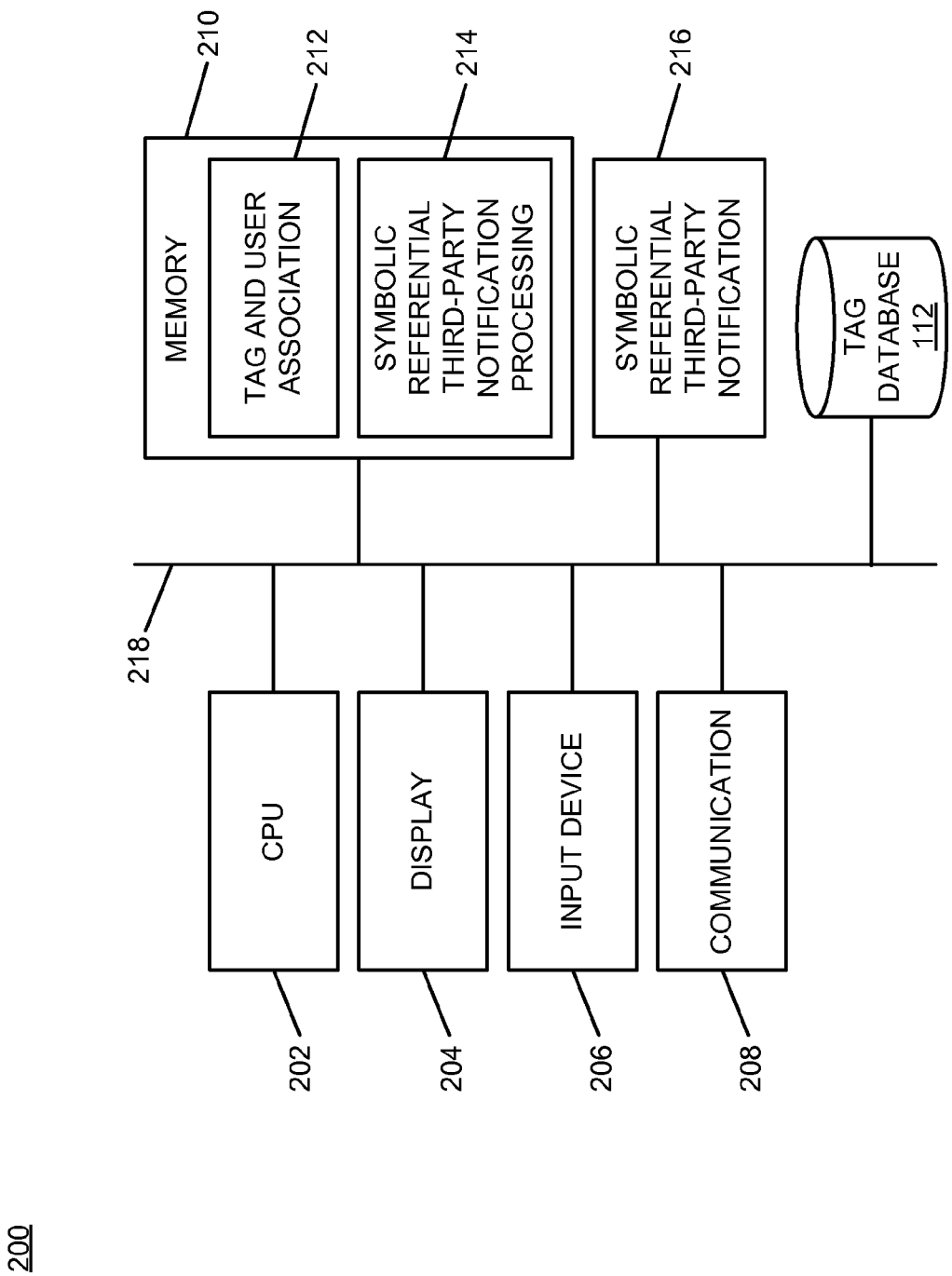
FIG. 2 is a block diagram of an example of an implementation of a core processing module capable of performing symbolic referential third-party notification according to an embodiment of the present subject matter.

FIG. 2 is a block diagram of an example of an implementation of a core processing module 200 capable of performing symbolic referential third-party notification. The core processing module 200 may be associated with either the computing device_1 102 through the computing device_N 104 or with the server_1 108 through the server_M 110, as appropriate for a given implementation. As such, the core processing module 200 is described generally herein, though it is understood that many variations on implementation of the components within the core processing module 200 are possible and all such variations are within the scope of the present subject matter.

Further, the core processing module 200 may provide different and complementary processing of symbolic referential third-party notification in association with each implementation. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 ("processor") provides hardware that performs computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, touchscreen, voice command processing unit, or any other type of input device by which the user may interact with and respond to information on the display 204.

It should be noted that the display 204 and the input device 206 may be optional components for the core processing module 200 for certain implementations/devices, or may be located remotely from the respective devices and hosted by another computing device that is in communication with the respective devices. Accordingly, the core processing module 200 may operate as a completely automated embedded device without direct user configurability or feedback. However, the core processing module 200 may also provide user feedback and configurability via the display 204 and the input device 206, respectively, as appropriate for a given implementation.

A communication module 208 provides hardware, protocol stack processing, and interconnection capabilities that allow the core processing module 200 to communicate with other modules within the system 100. The communication module 208 may include any electrical, protocol, and protocol conversion capabilities useable to provide interconnection capabilities, appropriate for a given implementation.

A memory 210 includes a tag and user association storage and processing area 212 that stores associations between tags and social network users within the core processing module 200. As will be described in more detail below, associations between tags and social network users stored within the tag and user association storage and processing area 212 is used to determine subsets of social network users within a social network that follow the social network topic identified by a text keyword of a social network tag or that are tagged by the respective tags.

The memory 210 also includes a symbolic referential third-party notification processing area 214. The symbolic referential third-party notification processing area 214 provides processing and storage for defining a referential third-party social network user notification subset within a social network in view of determined subsets of social network users within the social network that follow the social network topic as associated within the tag and user association storage and processing area 212. The symbolic referential third-party notification processing area 214 also provides storage and processing space for published referential third-party social network notifications and routing of responses to users.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

A symbolic referential third-party notification module 216 is also illustrated. The symbolic referential third-party notification module 216 provides evaluation of tag associations with social network users, and provides generation and processing of symbolic referential third-party notifications within the core processing module 200, as described above and in more detail below. The symbolic referential third-party notification module 216 implements the automated symbolic referential third-party notification of the core processing module 200.

It should be noted that the symbolic referential third-party notification module 216 may form a portion of other circuitry described without departure from the scope of the present subject matter. Further, the symbolic referential third-party notification module 216 may alternatively be implemented as an application stored within the memory 210. In such an implementation, the symbolic referential third-party notification module 216 may include instructions executed by the CPU 202 for performing the functionality described herein. The CPU 202 may execute these instructions to provide the processing capabilities described above and in more detail below for the core processing module 200. The symbolic referential third-party notification module 216 may form a portion of an interrupt service routine (ISR), a portion of an operating system, a portion of a browser application, or a portion of a separate application without departure from the scope of the present subject matter.

The tag database 112 is again shown within FIG. 2 associated with the core processing module 200, and may provide available tags that are defined within a social network for selection by users in association with the symbolic referential third-party notification described herein. As such, the tag database 112 may be operatively coupled to the core processing module 200 without use of network connectivity, as appropriate for a given implementation.

The CPU 202, the display 204, the input device 206, the communication module 208, the memory 210, the symbolic referential third-party notification module 216, and the tag database 112 are interconnected via an interconnection 218. The interconnection 218 may include a system bus, a network, or any other interconnection capable of providing the respective components with suitable interconnection for the respective purpose.

Though the different modules illustrated within FIG. 2 are illustrated as component-level modules for ease of illustration and description purposes, it should be noted that these modules may include any hardware, programmed processor(s), and memory used to carry out the functions of the respective modules as described above and in more detail below. For example, the modules may include additional controller circuitry in the form of application specific integrated circuits (ASICs), processors, antennas, and/or discrete integrated circuits and components for performing communication and electrical control activities associated with the respective modules. Additionally, the modules may include interrupt-level, stack-level, and application-level modules as appropriate. Furthermore, the modules may include any memory components used for storage, execution, and data processing for performing processing activities associated with the respective modules. The modules may also form a portion of other circuitry described or may be combined without departure from the scope of the present subject matter.

Additionally, while the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. It should also be understood that, though the tag database 112 is illustrated as a separate component for purposes of example, the information stored within the tag database 112 may also/alternatively be stored within the memory 210 without departure from the scope of the present subject matter. Accordingly, the core processing module 200 may take many forms and may be associated with many platforms.

Figure 3:
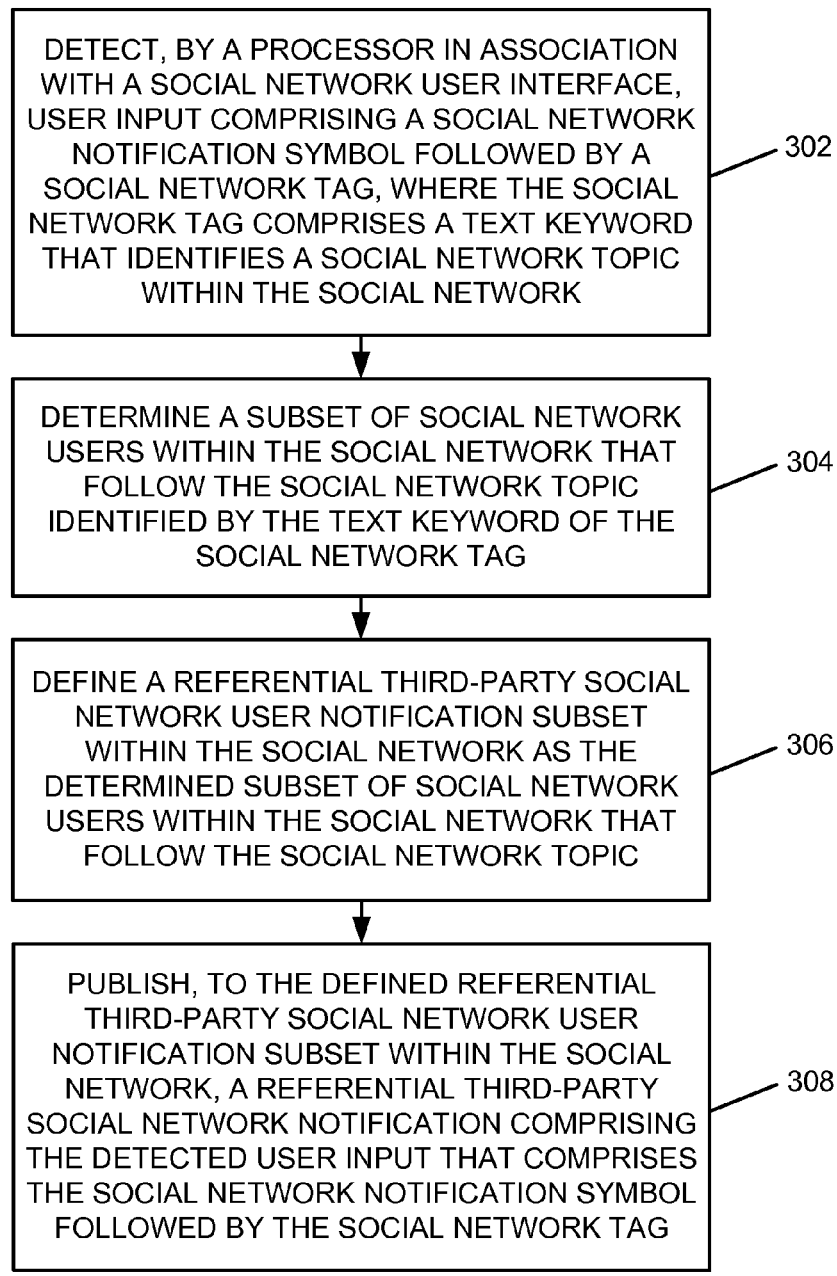
FIG. 3 is a flow chart of an example of an implementation of a process for symbolic referential third-party notification according to an embodiment of the present subject matter.
Figure 4A:
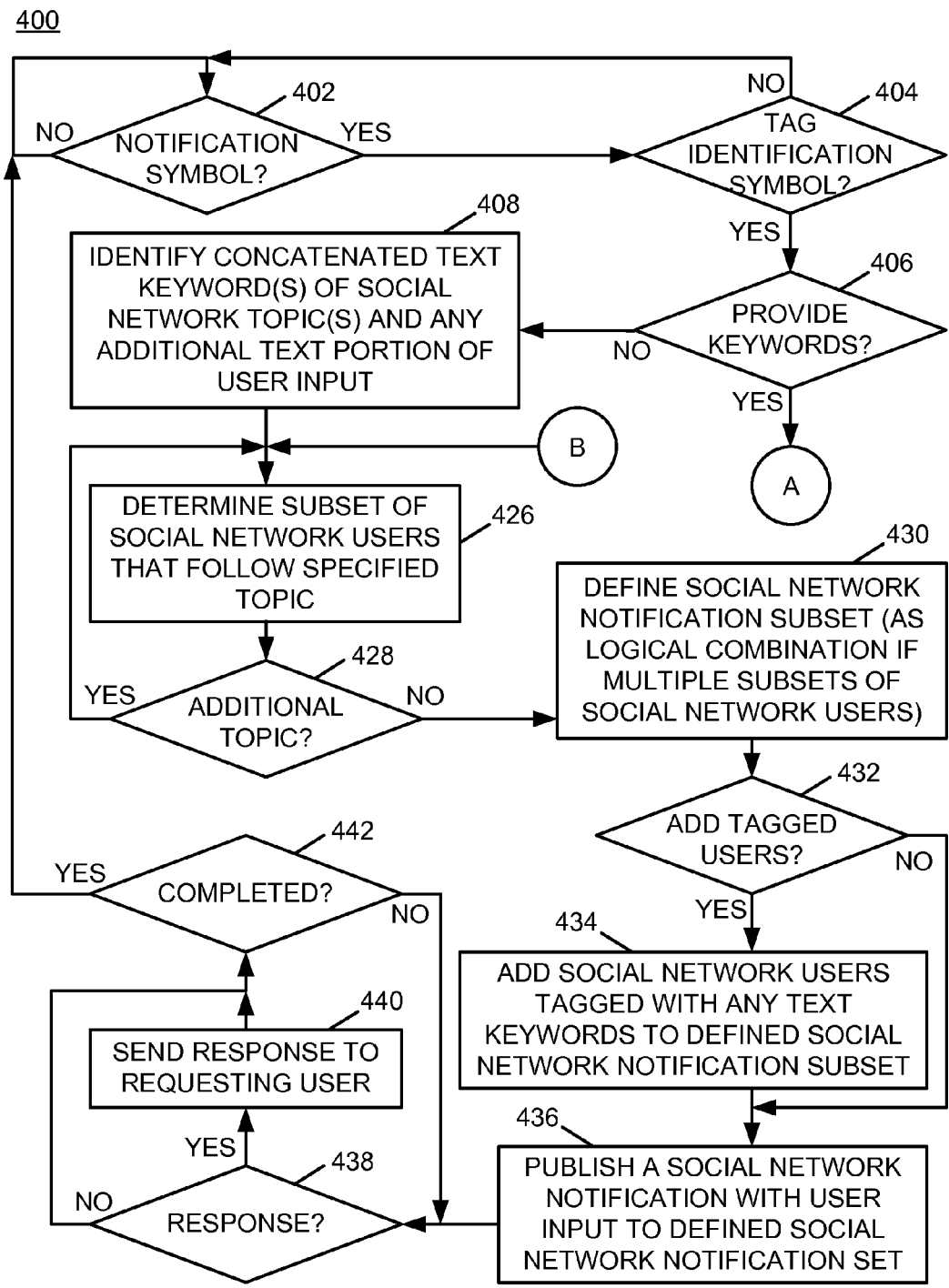
FIG. 4A is a flow chart of an example of an implementation of initial processing within a process for symbolic referential third-party notification according to an embodiment of the present subject matter.
Figure 4B:
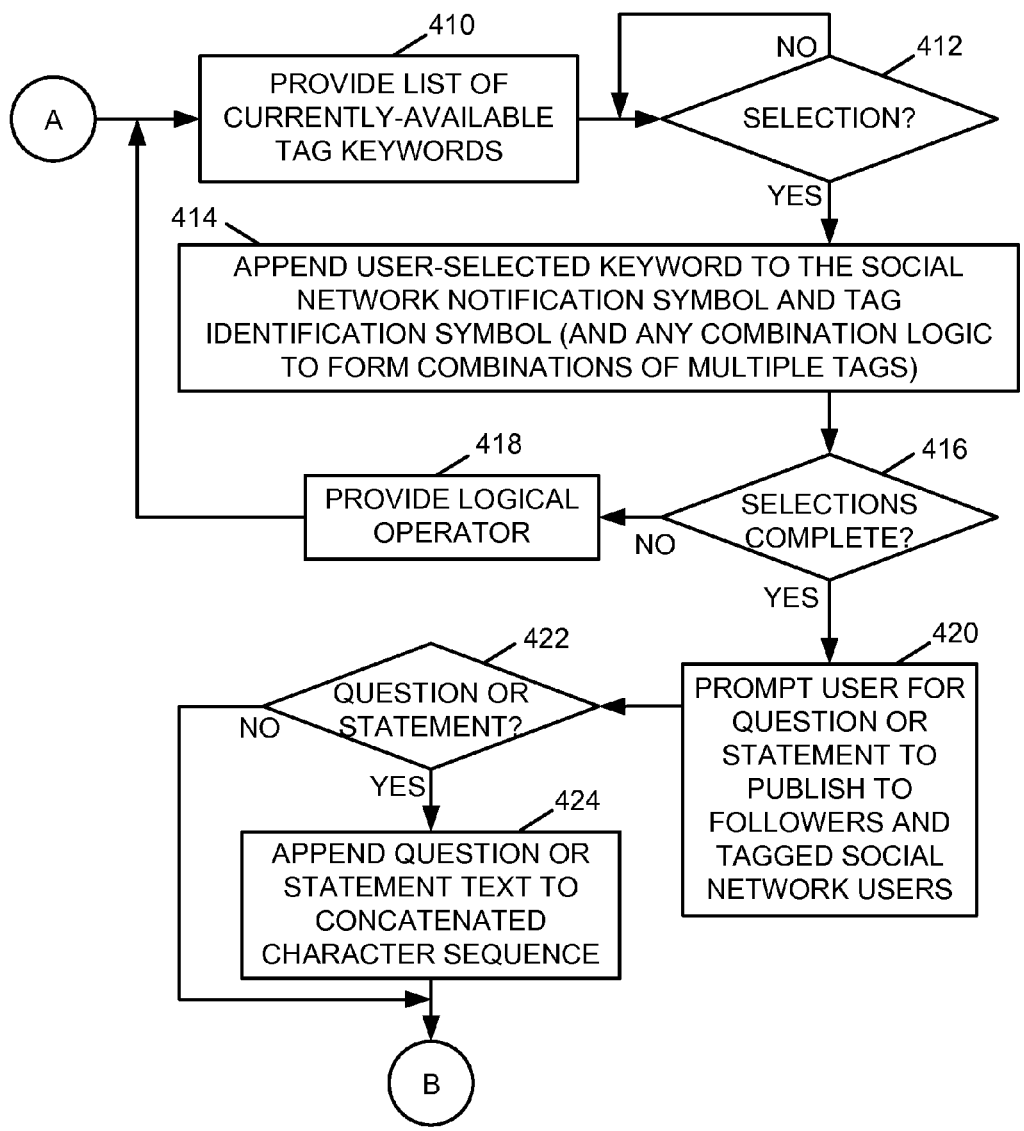
FIG. 4B is a flow chart of an example of an implementation of additional processing within the process of FIG. 4A for providing a list of available tag keywords within a social network for symbolic referential third-party notification according to an embodiment of the present subject matter.

FIG. 3 through FIG. 4B described below represent example processes that may be executed by devices, such as the core processing module 200, to perform the automated symbolic referential third-party notification associated with the present subject matter. Many other variations on the example processes are possible and all are considered within the scope of the present subject matter. The example processes may be performed by modules, such as the symbolic referential third-party notification module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter. Further, the described processes may be combined, sequences of the processing described may be changed, and additional processing may be added or removed without departure from the scope of the present subject matter.

FIG. 3 is a flow chart of an example of an implementation of a process 300 for symbolic referential third-party notification. At block 302, the process 300 detects, by a processor in association with a social network user interface, user input comprising a social network notification symbol followed by a social network tag, where the social network tag comprises a text keyword that identifies a social network topic within the social network. At block 304, the process 300 determines a subset of social network users within the social network that follow the social network topic identified by the text keyword of the social network tag. At block 306, the process 300 defines a referential third-party social network user notification subset within the social network as the determined subset of social network users within the social network that follow the social network topic. At block 308, the process 300 publishes, to the defined referential third-party social network user notification subset within the social network, a referential third-party social network notification comprising the detected user input that comprises the social network notification symbol followed by the social network tag.

FIGS. 4A-4B illustrate a flow chart of an example of an implementation of a process 400 for symbolic referential third-party notification. FIG. 4A illustrates initial processing within the process 400. At decision point 402, the process 400 makes a determination as to whether a social network notification symbol has been detected. As described above, the social network notification symbol may include an at (e.g., "@") symbol. In response to determining that a social network notification symbol has been detected, the process 400 makes a determination at decision point 404 as to whether a social network tag identification symbol has been detected. As described above, a social network tag may include a social network tag identification symbol followed by or concatenated with a text keyword that identifies a social network topic within the social network. As also described above, a network tag identification symbol, such as a pound symbol (e.g., "#"), may be followed by a keyword of a topic to formulate what may be referred to as a "hashtag." As such, the process 400 makes a determination as to whether user input that includes a social network notification symbol followed by or concatenated with a social network tag identification symbol has been detected. In response to determining that user input that includes a social network notification symbol followed by or concatenated with a social network tag identification symbol has not been detected, the process 400 returns to decision point 402 and iterates as described above.

Returning to the description of decision point 404, in response to determining that user input that includes a social network notification symbol followed by or concatenated with a social network tag identification symbol has been detected, the process 400 makes a determination at decision point 406 as to whether to provide keywords to the user that represent topics within the social network or whether the user wishes to manually enter the topic keywords. The determination at decision point 406 may be performed, for example, in response to prompting the user with an option to be provided with keywords of available tag topics within the social network from which to select one or more topics for use in symbolic referential third-party notification.

In response to determining that the user has elected to manually enter the topic keywords, the process 400 identifies one or more user-inputted text keywords of social network topics to formulate tags (including additional social network tag identification symbols and combination logic) and any additional text portion of user input at block 408. As also described above, the present technology provides for notifications of non-existent ad-hoc groups. As such users may manually enter keywords for topics that are not currently followed within a social network so that as other social network users begin following the tags, any questions presented may be made available to the users as part of the historical context associated with the respective tags.

As also described above, a user may logically combine two or more tags using a logical combination operator to identify subsets of social network users within a social network that follow a combination of tags (e.g., a logical "and" of followers of multiple tags). Further, filtering may be performed to identify subsets of social network users to follow one tag and that expressly do not follow another tag (e.g., a logical filtering or exclusion of followers of one or more tags).

Additionally, users may enter additional text portions, such as questions or other comments that will be posted to the followers and tagged social network users that are associated with the respective tags. A social network notification that includes the additional text portion of the user may be published to the respective followers and tagged social network users. As such, social network users may elicit responses from followers and tagged social network users of one or more tags by use of additional text portion(s) that are published as part of a redirected social network notification. Additional processing after decision point 408 within FIG. 4A will be deferred and discussed in more detail further below.

Returning to the description of decision point 406, in response to determining that the user has elected to be provided with keywords of available tag topics within the social network from which to select one or more topics for use in symbolic referential third-party notification, the process 400 transitions to the processing shown and described in association with FIG. 4B.

FIG. 4B illustrates additional processing associated with the process 400 of FIG. 4A for providing a list of available tag keywords within a social network for symbolic referential third-party notification. At block 410, the process 400 provides a list of currently-available (e.g., followed) tag keywords within the social network. At decision point 412, the process 400 makes a determination as to whether user selection of one of the currently-available tag keywords has been detected. In response to determining that a user selection of one of the currently-available tag keywords has been detected and received, the process 400 appends the user-selected keyword to the social network notification symbol and the tag identification symbol at block 414.

It should be noted, as described above and in more detail below, that a user may select more than one keyword from the list to form a logical combination of keywords. In such a situation, the user may further be provided with logical operators from which to select and combine sequentially-selected keywords, and the process 400 may detect and receive user selections of logical operators in association with detection and receipt of additional keywords. As such, the processing at block 414 may further include appending any selected logical operator to a previously-selected keyword followed by an additional tag identification symbol followed by a currently-selected keyword to designate the currently-selected keyword as an additional tag (e.g., collectively "combination logic"). The processing may further iterate as additional logical operators and keywords are selected by the user to iteratively construct a logical combination of tags as described above and in more detail below.

At decision point 416, the process 400 makes a determination as to whether user selection of tag keywords has been completed. For example, a user may be provided with a button within a dialog box for selection of currently-available keywords that indicates that selection has been completed and the process 400 may detect selection of such a button by the user. In response to determining at decision point 416 that user selection of keywords has not been completed, the process 400 provides a logical operator selection list to the user at block 418 as introduced above. As described above, many logical operators are possible for the combination of tags and topic keywords to identify subsets of social network users that follow or do not follow multiple tags.

A logical "and" operator (e.g., "&" or "and") may be used. Alternatively, a logical option to notify people that follow one tag and that do not follow another tag (e.g., "@#keyword1 &!#keyword2") may be used. Many other possible logical combinations of tags are possible, and all such possibilities for logical combinations of tags are considered within the scope of the present subject matter.

The process 400 again provides the list of currently-available tag keywords at block 410 and iterates as described above to append any user-selected logical operators and additional user-selected keywords to form a concatenated character sequence that represents a logical combination of tag keywords as specified by the user. Returning to the description of decision point 416, in response to determining that user selection of available tag keywords is completed, the process 400 prompts the user to enter a question or other statement to be published to the respective followers and tagged social network users associated with the entered keyword(s) at block 420.

At decision point 422, the process 400 makes a determination as to whether a question or statement has been entered by the user. In response to determining that a question or statement has been entered by the user, the process 400 appends the question or statement text to the concatenated character sequence at block 424.

In response to appending the question or statement text the concatenated character sequence at block 424, or in response to determining at decision point 422 that a question or statement text has not been entered by the user, the process 400 returns to the processing illustrated in FIG. 4A.

As described above in association with decision point 406 in FIG. 4A, the user may elect to manually enter keywords and text at block 408, or may use listings of available keywords as described above in association with FIG. 4B. As such, in response to completion of the processing at block 408 or the processing described above in association with FIG. 4B, the process 400 begins processing to iteratively determine subsets of the social network users that follow each specified topic by determining a subset of social network users that follow a selected one of the specified topics at block 426.

At decision point 428, the process 400 makes a determination as to whether there is an additional topic for which to identify and determine a subset of social network users. In response to determining that there is at least one additional topic for which to identify and determine a subset of social network users, process 400 returns to block 426 to determine the respective subset of social network users that follow the specified topic.

In response to determining at decision point 428 that there are no additional topics the process (all topics have been processed), the process 400 defines, at block 430, a social network notification subset including any logical combination of multiple subsets of social network users that have been specified by the user. For example, where the user specifies a logical combination operator that includes a logical union operator, the process 400 may form a logical combination of social network users as a logical union of all of the determined subsets of social network users within the social network that follow the social network topic and the determined additional subset of social network users within the social network that follow the additional social network topic. Alternatively, where the user specifies a logical combination operator that includes a logical exclusion operator that specifies exclusion of followers of the additional social network tag, the process 400 may form a logical combination of social network users as a filtered exclusion of one of the determined subset of social network users within the social network that follow the social network topic and the determined additional subset of social network users within the social network that follow the additional social network topic.

At decision point 432, the process 400 makes determination as to whether to add any tagged users to the defined social network user notification subset. In response to determining to add a least one tagged social network user to the defined social network user notification subset, the process 400 adds any additional social network users that are tagged with any associated text keywords within the social network to the defined social network user notification subset at block 434.

At block 436, the process 400 publishes a social network notification with the user input to the defined social network notification subset. The process 400 publishes the social network notification that includes the detected user input that itself includes the social network notification symbol concatenated with a social network tag (and any logical combination of tags or additional text such as a question or statement) to the defined social network user notification subset within the social network.

As described above, the publication of the social network notification to the defined subset of social network users surfaces both the notification itself and the logic that resulted in the notification to respective message boards of the social network users within the defined social network user notification subset, meaning that the notification itself includes the actual text entered by the user. The actual text entered by the user is used to identify the respective set of followers and tagged users, and as such provides the logic by which the social network user notification subset of social network users was derived. As such, the notified social network users will see the actual tag or logical combination of tags by which they were notified, which exposes the logic by which the social network user notification subset was defined.

At decision point 438, the process 400 makes a determination as to whether one or more responses have been received from social network users that were notified by the social network notification. For example, social network users may respond to questions posed within the social network notification by responding directly to the posting social network user. As such, in response to determining that one or more responses have been received from the social network users that were notified by the social network notification, the process 400 sends the respective responses to the requesting user at block 440. In response to sending any received responses to the requesting user at block 440, or in response to determining at decision point 438 that no responses have been received (e.g., no question was posed to the notification subset), the process 400 makes a determination at decision point 442 as to whether all processing is completed for the respective social network notification. For example, an extended time period for social network user responses may be configured. As such, in response to determining at decision point 442 that all processing is not completed for the respective social network notification, the process 400 returns to decision point 438 and iterates as described above. In response to determining at decision point 442 that all processing is completed for the respective social network notification, the process 400 returns to decision point 402 and iterates as described above.

As such, the process 400 allows social network users to define ad-hoc social network groups to which to generate social network notifications to interact with followers of tags and tagged social network users. The social network users may use tags to represent followed topics and may define tags that do not currently exist within the social network for which to elicit social network user responses. Social network user notification subsets and logical combinations of ad-hoc groups of social network users may be combined to form and define social network user notification subsets. The social network notification includes the tags entered by the user, and as such, includes the logic by which the respective social network users are notified. Accordingly, the respective social network users that are notified by the social network notification may understand the reason for the notification directly from the notification itself, and may respond more comprehensively based upon that understanding of why they were notified.

As described above in association with FIG. 1 through FIG. 4B, the example systems and processes provide symbolic referential third-party notification. Many other variations and additional activities associated with symbolic referential third-party notification are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art based upon the teachings herein without departing from the scope and spirit of the invention.

The subject matter was described to explain the principles of the invention and the practical application, and to enable others of ordinary skill in the art to understand the invention for various embodiments with various modifications as are suited to the particular use contemplated.

What is claimed is:

1. A system, comprising:
a user input device; and
a processor programmed to:
  detect, via the user input device in association with a social network user interface, user input comprising a social network notification symbol followed by a social network tag, where the social network tag comprises a text keyword that identifies a social network topic within the social network;
  determine a subset of social network users within the social network that follow the social network topic identified by the text keyword of the social network tag;
  define a referential third-party social network user notification subset within the social network as the determined subset of social network users within the social network that follow the social network topic; and
  publish, to the defined referential third-party social network user notification subset within the social network, a referential third-party social network notification comprising the detected user input that comprises the social network notification symbol followed by the social network tag.

2. The system of claim 1, where the processor is further programmed to:
  detect, via the user input device, an additional text portion of the user input following the social network notification symbol and the social network tag, where the additional text portion of the user input comprises a question asked by the user within the user input;
  where, in being programmed to publish, to the defined referential third-party social network user notification subset within the social network, the referential third-party social network notification comprising the detected user input that comprises the social network notification symbol followed by the social network tag, the processor is programmed to:
    publish the social network notification symbol followed by the social network tag followed by the additional text portion of the user input within the referential third-party social network notification;
  detect, via the user input device, a response to the question from at least one social network user that received the referential third-party social network notification; and
  send the detected response to the user that asked the question published within the referential third-party social network notification.

3. The system of claim 1, where the processor is further programmed to:
  add, to the defined referential third-party social network user notification subset, at least one additional social network user tagged within the social network with the social network tag.

4. The system of claim 1, where the user input further comprises a logical combination operator specified by the user and an additional social network tag, where the additional social network tag comprises an additional text keyword that identifies an additional social network topic within the social network, and the processor is further programmed to:
  determine an additional subset of social network users within the social network that follow the additional social network topic identified by the additional text keyword of the additional social network tag; and
  where, in being programmed to define the referential third-party social network user notification subset within the social network further, the processor is programmed to:
    define the referential third-party social network user notification subset within the social network as a logical combination of the determined subset of the social network users that follow the social network topic and the determined additional subset of the social network users that follow the additional social network topic.

5. The system of claim 4, where, in being programmed to define the referential third-party social network user notification subset within the social network as the logical combination of the determined subset of the social network users that follow the social network topic and the determined additional subset of the social network users that follow the additional social network topic, the processor is programmed to one of:
  where the logical combination operator comprises a logical union operator:
    form a logical union of all of the determined subset of the social network users that follow the social network topic and the determined additional subset of the social network users that follow the additional social network topic; and
  where the logical combination operator comprises a logical exclusion operator that specifies exclusion of followers of the additional social network tag:
    filter to remove any social network users that follow the additional social network topic identified by the additional text keyword of the additional social network tag from the subset of the social network users that follow the social network topic identified by the text keyword of the social network tag.

6. The system of claim 1, where the social network tag further comprises a social network tag identification symbol, and the processor is further programmed to:
  provide, to the user in response to detection of the social network notification symbol followed by the social network tag identification symbol as part of the user input, a list of currently-available social network tag keywords defined within the social network;
  receive, via the user input device, a user-selected currently-available social network tag keyword from the provided list as the text keyword of the user input; and
  append the user-selected currently-available social network tag keyword to the detected social network tag identification symbol.

7. A computer program product, comprising:
a computer readable storage medium having computer readable program code embodied therewith, where the computer readable program code when executed on a computer causes the computer to:
  detect, in association with a social network user interface, user input comprising a social network notification symbol followed by a social network tag, where the social network tag comprises a text keyword that identifies a social network topic within the social network;

determine a subset of social network users within the social network that follow the social network topic identified by the text keyword of the social network tag;

define a referential third-party social network user notification subset within the social network as the determined subset of social network users within the social network that follow the social network topic; and publish, to the defined referential third-party social network user notification subset within the social network, a referential third-party social network notification comprising the detected user input that comprises the social network notification symbol followed by the social network tag.

8. The computer program product of claim 7, where the computer readable program code when executed on the computer further causes the computer to detect an additional text portion of the user input following the social network notification symbol and the social network tag; and where, in causing the computer to publish, to the defined referential third-party social network user notification subset within the social network, the referential third-party social network notification comprising the detected user input that comprises the social network notification symbol followed by the social network tag, the computer readable program code when executed on the computer causes the computer to:

publish the social network notification symbol followed by the social network tag followed by the additional text portion of the user input within the referential third-party social network notification.

9. The computer program product of claim 8 where the additional text portion of the user input comprises a question asked by the user within the user input, and where the computer readable program code when executed on the computer further causes the computer to comprising:

detect a response to the question from at least one social network user that received the referential third-party social network notification; and send the detected response to the user that asked the question published within the referential third-party social network notification.

10. The computer program product of claim 7, where the computer readable program code when executed on the computer further causes the computer to:

add, to the defined referential third-party social network user notification subset, at least one additional social network user tagged within the social network with the social network tag.

11. The computer program product of claim 7, where the user input further comprises a logical combination operator specified by the user and an additional social network tag, where the additional social network tag comprises an additional text keyword that identifies an additional social network topic within the social network, and where the computer readable program code when executed on the computer further causes the computer to:

determine an additional subset of social network users within the social network that follow the additional social network topic identified by the additional text keyword of the additional social network tag; and where, in causing the computer to define the referential third-party social network user notification subset within the social network, the computer readable program code when executed on the computer further causes the computer to:

define the referential third-party social network user notification subset within the social network as a logical combination of the determined subset of the social network users that follow the social network topic and the determined additional subset of the social network users that follow the additional social network topic.

12. The computer program product of claim 11, where, in causing the computer to define the referential third-party social network user notification subset within the social network as the logical combination of the determined subset of the social network users that follow the social network topic and the determined additional subset of the social network users that follow the additional social network topic, the computer readable program code when executed on the computer causes the computer to one of:

where the logical combination operator comprises a logical union operator:

form a logical union of all of the determined subset of the social network users that follow the social network topic and the determined additional subset of the social network users that follow the additional social network topic; and where the logical combination operator comprises a logical exclusion operator that specifies exclusion of followers of the additional social network tag:

filter to remove any social network users that follow the additional social network topic identified by the additional text keyword of the additional social network tag from the subset of the social network users that follow the social network topic identified by the text keyword of the social network tag.

13. The computer program product of claim 7, where the social network tag further comprises a social network tag identification symbol, and where the computer readable program code when executed on the computer further causes the computer to:

provide, to the user in response to detection of the social network notification symbol followed by the social network tag identification symbol as part of the user input, a list of currently-available social network tag keywords defined within the social network;

receive a user-selected currently-available social network tag keyword from the provided list as the text keyword of the user input; and append the user-selected currently-available social network tag keyword to the detected social network tag identification symbol.

* * * * *